Jan. 15, 1957  B. S. BLAISSE  2,777,360
INTERFERENCE-MICROSCOPE
Filed May 15, 1952

INVENTOR.
Berndt Stephan Blaisse
BY
Henderoth, Lind & Ponack
Attorneys.

United States Patent Office 2,777,360
Patented Jan. 15, 1957

2,777,360

INTERFERENCE-MICROSCOPE

Berndt Stephan Blaisse, Voorburg, Netherlands, assignor to N. V. Optische Industrie "De Oude Delft," Delft, Netherlands Application May 15, 1952, Serial No. 287,923

Claims priority, application Netherlands May 18, 1951

3 Claims. (Cl. 88—39)

The invention is related to an interference-microscope. Such a microscope can be realized in two ways.

In the first type there are two geometrically different optical paths. The beams of light following one path form the coherent background, whilst those following the other path go through the object.

In the second type there is only one geometrical path, but two beams are formed with a considerable phase-difference.

The invention is related to a microscope of the second type. It is characterized in that the splitting of the two beams is effected by a birefringent crystal plate which is provided between the condenser and the object or mounted in the condenser, whilst the recombination of the beams is effected by a birefringent crystal plate which is provided between object and objective, or mounted in the objective.

In this way the great advantage is obtained by applying two small crystal plates in a normal microscope, this microscope becomes an interference-microscope. The crystal plates may be small according to the invention because they are provided near the object, where the active light beams have their smallest diameter.

When the numerical aperture of the microscope is restricted to 0.50 at the utmost, it is advisable according to the invention to split the beam for imagery and that for obtaining the coherent background out of a linearly polarized beam by means of a uniaxial crystal plate which is cut parallel to the optical axis, whilst the recombination of the beams after passing through the object is effected by a crystal plate identical to the first, but mounted in a crosswise position.

For a better understanding of the invention reference may be made to the accompanying drawings.

Figure 1:
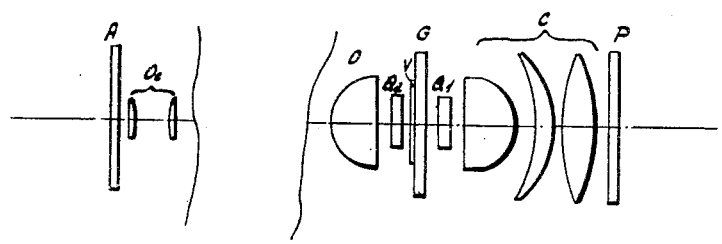
Figure 2:
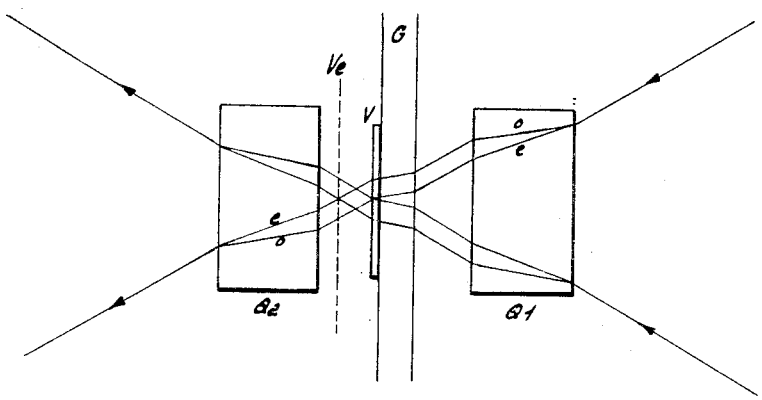

Fig. 1 represents a cross section of a microscope according to the invention in which only the essential optical parts are shown. In this Fig. 1:

$P$=polarizer
$C$=condenser
$Q_1$=uniaxial crystal plate cut parallel to the optical axis and placed in a position of 45° with respect to P
$G$=object-glass
$V$=object
$Q_2$=uniaxial crystal plate identical to $Q_1$, but rotated 90° with respect to $Q_1$
$O$=frontlens of the objective
$O_c$=ocular lenses
$A$=analyzer Furthermore in Fig. 2 the path of the beams near the object plane of the microscope of Fig. 1 is represented.

In Fig. 2 any ray coming from the right hand side has passed the polarizer P (Fig. 1) so that it is polarized linearly. It will be split in crystal plate $Q_1$ into an ordinary ray $o$ and an extra-ordinary ray $e$ of the same amplitude, as $Q_1$ is in the 45°-position with respect to P. Both rays pass subsequently G and V and then arrive at $Q_2$. The optical axis of $Q_2$ being in a crosswise position with respect to that of $Q_1$ the extra-ordinary ray from $Q_1$ becomes an ordinary ray in $Q_2$ and vice versa. Thus the following two images are formed:

(1) The object V will be projected by the ordinary rays of $Q_2$ in the focal plane of the ocular, and will be observed sharply.

(2) The plane $V_e$ marked in dotted lines will be imaged by the extra-ordinary rays of $Q_2$ outside the focal plane of the ocular, so that it will not be observed.

The ordinary and extra-ordinary light rays originated in $Q_1$, are recombined by $Q_2$ and will have traversed the same optical path, if there is no object. If an object is present this will cause an optical path difference between the beams which produce the image and those which give the coherent background. Although the latter will be also influenced by the object V, the resulting phase-difference in the focal plane of the ocular will be an average for a great part of the object and will consequently have a small value. This is particularly so with objects with phase-contrast, for which case the interference-microscope has been developed.

The crystal plates can e. g. be made of calcite with a thickness of 1.4 mm. The distance $VV_e$ measured in air then amounts to 100 microns whereas the depth of focus with a numerical aperture of 0.30 is only 6 microns.

If the numerical aperture is greater than 0.30, it is advisable according to the invention, to split the beam for imagery and that for the coherent background from a circularly polarized beam by means of a uniaxial crystal plate which is cut perpendicularly to the optical axis, whilst the recombination of the beams after passing through the object is effected by a crystal plate which is identical to the first. Moreover, between the two crystal plates a layer of an optically active substance is provided, which rotates the plane of polarisation 90°.

Figure 3:
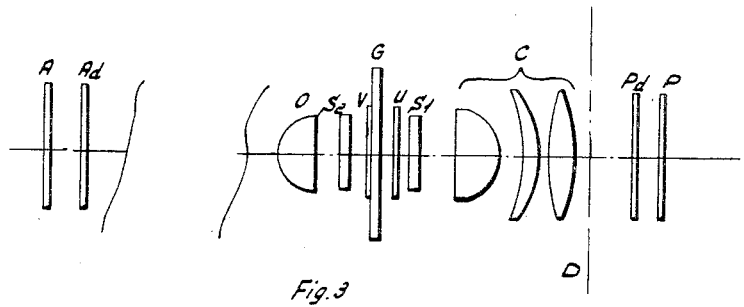

In Fig. 3 the set up of this form of the microscope according to the invention is drawn schematically. In this drawing:

$P$=polarizer
$P_d$=¼λ plate in 45°-position with respect to P
$D$=diaphragm in the form of a ring
$C$=condenser
$S_1$=uniaxial crystal plate cut perpendicularly to the optical axis
$U$=layer of optically active substance rotating the plane of polarisation 90°
$G$=object-glass
$V$=object
$S_2$=crystal plate identical to $S_1$
$O$=frontlens of the objective
$A_d$=¼λ plate in a 45°-position with respect to analyzer A
$A$=analyzer The object is illuminated preferably by a hollow conic light beam. A ray of circularly polarized light incident on $S_1$ obliquely, will be split up into the ordinary and extra-ordinary rays which vibrate perpendicularly to one another, and which are refracted in different directions. Thus a result is obtained which is identical to that represented in Fig. 2. In order to attain that the ordinary ray emanating from $S_1$ passes through $S_2$ as an extra-ordinary ray and vice versa, U is provided. This is an optical active substance rotating the plane of polarisation 90° and thus produces the desired effect. As the set-up has rotational symmetry with respect to the optical axes of $S_1$ and $S_2$, the above holds good for any light ray.

According to the invention it is advisable to achromatize the layer of the optically active substance in view of the dispersion of the rotation of the plane of polarisation. The achromatising can be realized by applying two optically active layers, producing a clockwise and a counterclockwise rotation respectively, which have a slightly different dispersion. By a suitable choice of the thicknesses of the two layers the effect is obtained that for two wave lengths the rotation of the plane of polarisation is 90°. As combinations of optically active substances the active amylester of paranitrobenzene aminocinnamic acid and the cholesteryl ester of paranitrocinnamic acid are suitable.

The layer of the optically active substance U in Fig. 3 can be replaced by a set of two $\lambda/2$ plates which are placed in the 45°-position with respect to each other, so that a 90° rotation of the plane of polarization is obtained. These plates will be preferably achromatized by applying two suitable materials as e. g. cellophane and mica or very thin plates of calcite and artificial rutile.

In another modification of the microscope according to the invention, the crystal plates $S_1$ and $S_2$ are again uniaxial and cut perpendicularly to the optical axis, but $S_1$ is made of a positive crystal and $S_2$ of a negative one, or vice versa, whilst no layer U is applied. Consequently the ordinary and extra-ordinary rays emanating from the first crystal plate will be recombined in the second crystal plate, if no object is inserted which introduces phase differences. A suitable combination is for instance the positive crystal of artificial rutile and the negative crystal calcite.

I claim:

1. An interference-microscope in which the beam for imagery and that for obtaining the coherent background follow the same path geometrically comprising in combination means for supporting an object in an object plane to be illuminated by a beam of light, a condenser for concentrating said beam on said object plane, an objective having a numerical aperture larger than 0.3 focused on to said object plane for receiving the beam after it has left the object plane and producing an enlarged real image of the object, means for viewing the image, polarizing means located in the path of said beam before it reaches said object plane, a birefringent crystal plate located in the light path between said condenser and said means for supporting said object for dividing said beam into an ordinary ray and an extraordinary ray, a second birefringent crystal plate located in the path of said beam after it has left said object plane for recombining said ordinary and extraordinary rays and an analyzer located in the path of said beam after it has left said second plate, said second plate by virtue of its birefringence presenting mutually different optical path lengths to said ordinary and extraordinary rays when an object is present, whereby when a transparent object is examined comprising portions which have mutually different optical thicknesses supported at said object plane the image exhibits coincidentally viewable interference effects corresponding to the said portions of the object and resulting from the modification by the object of the relationship between the path lengths of at least one pair of said ordinary and extraordinary rays, said ordinary ray being focused at said object plane while said extraordinary ray is focused outside said object plane.

2. An interference-microscope in which the beam for imagery and that for obtaining the coherent background follow the same path geometrically comprising in combination means for supporting an object in an object plane to be illuminated by a beam of light, a condenser for concentrating said beam on said object plane, an objective focused on to said object plane for receiving the beam after it has left the object plane and producing an enlarged real image of the object, means for viewing the image, polarizing means located in the path of said beam before it reaches said object plane, a birefringent positive uniaxial crystal plate, a birefringent negative uniaxial crystal plate, said negative plate being mounted crosswise with respect to said positive plate and said plates being cut parallel to their optical axis, one of said plates being located in the light path between said condenser and said means for supporting said object for dividing said beam into an ordinary ray and an extraordinary ray and the other of said plates being located between said means for supporting said object and said objective in the path of said beam after it has left said object plane for recombining said ordinary and extraordinary rays and an analyzer located in the path of said beam after it has left the second of said plates, said second plate by virtue of its birefringence presenting mutually different optical path lengths to said ordinary and extraordinary rays when an object is present, whereby when a transparent object is examined comprising portions which have mutually different optical thicknesses supported at said object plane the image exhibits coincidentally viewable interference effects corresponding to the said portions of the object and resulting from the modification by the object of the relationship between the path lengths of at least one pair of said ordinary and extraordinary rays, said ordinary ray being focused at said object plane while said extraordinary ray is focused outside said object plane.

3. An interference-microscope in which the beam for imagery and that for obtaining the coherent background follow the same path geometrically comprising in combination means for supporting an object in an object plane to be illuminated by a beam of light, a condenser for concentrating said beam on said object plane, an objective focused on to said object plane for receiving the beam after it has left the object plane and producing an enlarged real image of the object, means for viewing the image, polarizing means located in the path of said beam before it reaches said object plane, a birefringent positive uniaxial crystal plate, a birefringent negative uniaxial crystal plate, said plates being cut perpendicular to their optical axis, one of said plates being located in the light path between said condenser and said means for supporting said object for dividing said beam into an ordinary ray and an extraordinary ray and the other of said plates being located between said means for supporting said object and said objective in the path of said beam after it has left said object plane for recombining said ordinary and extraordinary rays and an analyzer located in the path of said beam after it has left the second of said plates, said second plate by virtue of its birefringence presenting mutually different optical path lengths to said ordinary and extraordinary rays when an object is present, whereby when a transparent object is examined comprising portions which have mutually different optical thicknesses supported at said object plane the image exhibits coincidentally viewable interference effects corresponding to the said portions of the object and resulting from the modification by the object of the relationship between the path lengths of at least one pair of said ordinary and extraordinary rays, said ordinary ray being focused at said object plane while said extraordinary ray is focused outside sid object plane.

References Cited in the file of this patent

UNITED STATES PATENTS 2,601,175    Smith _____ June 17, 1952

OTHER REFERENCES

Jenkins and White: "Fundamentals of Optics," second edition, pages 537–540, published 1950, McGraw-Hill Book Company, N. Y.